Aug. 7, 1962 C. A. COOK ET AL 3,048,247
FRICTION CLUTCH WITH POSITIVE LOCK
Filed Dec. 12, 1957

INVENTORS.
CHARLES A. COOK
WALTER H. FREITAG
BY J. Frederick Bechtol
ATTY.

United States Patent Office 3,048,247
Patented Aug. 7, 1962

3,048,247
FRICTION CLUTCH WITH POSITIVE LOCK
Charles A. Cook and Walter H. Freitag, Jackson, Mich., assignors to Clark Equipment Company, a corporation of Michigan
Filed Dec. 12, 1957, Ser. No. 702,421
14 Claims. (Cl. 192—53)

The present invention relates generally to a new and improved clutch mechanism and is particularly concerned with a friction type clutch which is provided with mechanism for synchronizing and locking together two relatively rotatable members as, for example, in a vehicle transmission.

In transmissions for use in heavy duty vehicles and, particularly, in very large power shift transmissions it has become necessary to provide clutches of relatively large capacity in view of the increasingly heavy loads that the clutches are forced to carry. Clutches normally employed in transmissions of the type described above comprise a number of interleaved clutch plates respectively carried by the two rotatable members to be connected together and these clutch plates are usually moved into engagement by means of a fluid operated piston or the like. Prior attempts to meet the problem of providing larger capacity clutches have included the provision of clutch plates having larger contacting areas in order to increase the frictional force, the provision of a greater number of clutch plates in order to increase the total effective force, or the use of a combination of these factors. These proposals are not altogether satisfactory, however, since they involve an increase in the space required for the clutch and the attendant necessity for using control valves, hoses, fittings, and pumps of increased size. The use of clutches of increased size may make the transmission so large and bulky that it will not fit conveniently into the available space on the vehicle. Moreover, all of these factors increase considerably the cost of the transmission and make its maintenance and repair much more difficult. In addition, when it is desired to manufacture a full line of clutches, that is, a line of clutches running from those of relatively small capacity to those of much larger capacity, it is both inconvenient and costly to resort to changes in the size of the plates or to the use of an increased number of plates to increase clutch capacity due to the excessive tooling expense involved in providing parts for clutches of radically different construction. In addition, after such clutches have been installed in different vehicles problems are encountered with respect to high service costs both for parts and labor due to the necessity for stocking a large number of spare parts when components of different design are employed on different transmissions that may be serviced in a single garage or repair shop.

The present invention has for its principal object the provision of a clutch including friction plates of the type described above for connecting two relatively rotatable members but also including a positive type clutch for connecting the members in order to insure drive therebetween even though the input torque exceeds the holding capacity of the friction clutch elements.

A further object of the invention is to provide a clutch mechanism of the above character which includes new and improved mechanism for preventing engagement of the positive clutch until the rotatable members are substantially synchronized.

It is another object of the invention to provide a fluid operated, friction clutch for interconnecting a pair of relatively rotatable members together with a positive clutch which also functions to connect the rotatable members and which is operated by the fluid pressure delivered to the friction clutch.

A still further object of the present invention is to provide a clutch having a very large capacity which is nevertheless characterized by simple, compact construction so that it can be conveniently used in transmissions where space must be conserved.

The invention, both as to its organization and manner of operation, together with further objects and advantages, will best be understood by reference to the following detailed description taken in conjunction with the accompanying drawing wherein.

Figure 1:
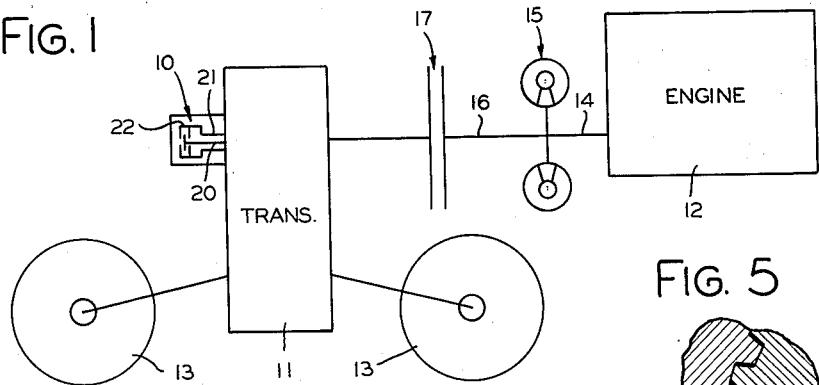
FIG. 1 is a schematic diagram illustrating a drive system in which the clutch of the present invention may be used.
Figure 5:
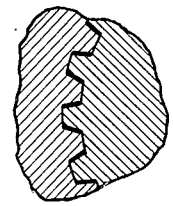
FIG. 5 is an enlarged fragmentary view showing the synchronizer mechanism after the positive type clutch has been rendered operative.

Referring now to the drawings and particularly to FIG. 1 thereof, the clutch of the present invention is there identified generally by the reference numeral 10 and is illustrated for use in a conventional transmission 11 employed in the drive train between an engine or prime mover 12 and the driven wheels 13 of the vehicle. The output shaft 14 of the engine drives the impeller of a conventional torque converter or fluid coupling 15 the output of which is connected to drive an intermediate shaft 16. The drive from the shaft 16 to the input of the transmission 11 is adapted to be interrupted by means of a master clutch 17 which is preferably operated by means of a suitable hydraulic control system, identified by reference numeral 18 in FIG. 2, in order to remove the load on the transmission components during shifting.

Figure 2:
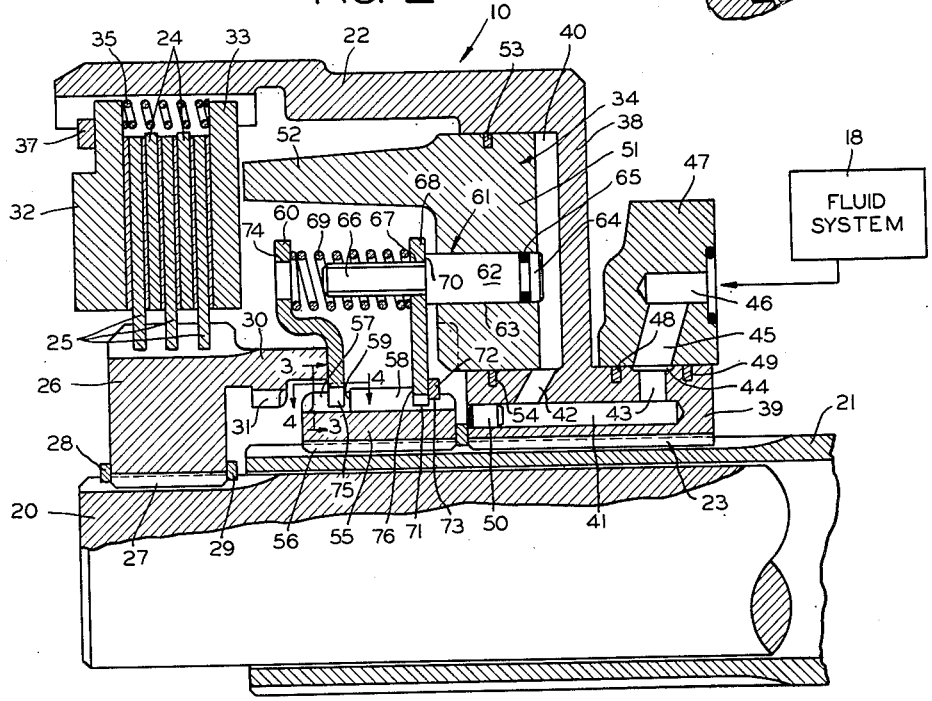
FIG. 2 is a fragmentary, side elevation view principally in section showing one half of a clutch mechanism characterized by the features of the present invention.

The clutch 10 is employed to interconnect a pair of rotatable members in the transmission and is actuated in sequence with the master clutch 17 by fluid pressure supplied by the hydraulic control system 18. More specifically, as is illustrated in FIG. 2, the clutch 10 is adapted to connect an inner shaft 20 with a quill shaft 21 encircling and telescoping over the inner shaft. To this end, a clutch drum 22 is splined to the quill shaft 21 as indicated at 23 and this drum carries a plurality of annular clutch discs or plates 24 interleaved with a somewhat similar group of clutch plates 25 carried upon a clutch support element 26 which is, in turn, splined to the inner shaft 20 as indicated at 27. Thus, when the interleaved plates 24 and 25 are forced into frictional engagement by mechaninm to be described more fully hereinafter, the quill shaft 21 is connected to the inner shaft 20 by means of the gripping action between the sets of plates 24 and 25. The clutch plate support 26 is maintained in fixed axial position on the inner shaft 20 by means of snap rings 28 and 29 seated within annular grooves in the inner shaft and engaging opposed sides of the support element 26. The support element 26 further includes an annular flange 30 extending toward the right as viewed in FIG. 2 and provided on its underside with downwardly depending teeth or projections 31 which function as one of the clutch elements of the positive type clutch to be described more fully below.

The clutch drum 22 carries a pair of annular face blocks 32 and 33 cooperating with a fluid operated piston 34 to effect frictional engagement of the plates 24 and 25. Blocks 32 and 33 are normally biased apart by means of a plurality of spaced coil springs 35 so that the plates 24 and 25 are normally held out of engagement. The springs 35 normally seat the clutch block 32 against a fixed stop 37 in the form of an annular ring seated within a groove in the inner face of the clutch drum 22. The clutch block 33 is, of course, mounted for sliding movement upon the clutch drum 22 and, when it is moved to the left as viewed in FIG. 2 by movement of the piston 34, it functions to compress the coil springs 35 and to force the plates 24 and 25 into engagement.

The clutch drum 22 includes a front wall portion 38 cooperating with an inner cylindrical sleeve 39 on the drum to define a chamber 40 accommodating the head of the piston 34. As indicated above, the sleeve 39 is connected to the quill shaft 21 by means of a spline connection identified by the reference numeral 23. For the purpose of supplying fluid to the chamber 40 in order to move the piston 34 to the left as viewed in FIG. 2, the sleeve 39 is provided with a longitudinal passage 41 which is connected through passage 42 to the chamber 40 and which is also connected through radial passage 43 to an annular groove 44 defined in the periphery of the sleeve. The free end of the longitudinal passage 41 is closed by means of a suitable plug 50 drive fitted therein. The annular groove 44 communicates with fluid passages 45 and 46 formed in a fluid supply ring 47 encircling the outer end of the sleeve 39. The passages 45 and 46 receive fluid under pressure from the hydraulic control system 18 referred to above, and this fluid pressure is supplied through appropriate control valves whenever the members 20 and 21 are to be connected. Suitable means are provided for preventing escape of fluid between the engaging surfaces of the sleeve 39 and the ring 47, which means may comprise sealing rings carried within annular grooves 48 and 49 defined in the sleeve 39.

The piston 34 comprises an annular head portion 51 seated snugly within the chamber 40 together with an annular extension 52 which is adapted to engage the movable clutch block 33 when the piston is moved to the left by means of fluid pressure supplied to the chamber 40 from the fluid supply system 18. The piston 34 is thus movable from an inoperative position shown in FIG. 2 wherein the interleaved clutch plates 24 and 25 are disengaged to an operative position wherein the plates 24 and 25 are in frictional engagement. The head 51 is provided with an annular groove 53 in its outer periphery for accommodating a sealing ring in order to prevent the escape of fluid from the chamber 40 along the outer edge of the piston head. A similar groove 54 in the sleeve 39 also accommodates a sealing ring for preventing the escape of fluid along the inner side of the piston head.

Figure 4:
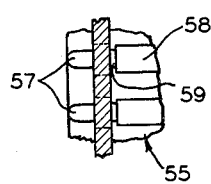
FIG. 4 is an enlarged, fragmentary, sectional view taken along a line substantially corresponding to the line 4—4 in FIG. 2.

As previously mentioned the clutch 10 also includes a positive type clutch which is adapted to connect the members 20 and 21 in order to insure drive therebetween even though the input torque under extremely heavy load conditions may exceed the holding capacity of the clutch plates 24 and 25. This positive type clutch includes, in addition to the projections 31 mentioned above, a sleeve 55 which is splined to and slidable along the quill shaft 21 as indicated by reference numeral 56. The sleeve 55 includes a first externally toothed portion 57 engageable with the projections 31 to provide a positive drive from the quill shaft 21 to the inner shaft 20 through the clutch plate support 26 and the sleeve 55. The sleeve 55 also includes a second externally toothed portion 58 having teeth that are somewhat larger than the teeth 57 as is apparent from FIG. 4 of the drawings. The toothed portions 57 and 58 are joined by a shoulder 59 cooperating with a synchronizer plate 60 to be described more fully hereinafter to prevent engagement of the positive clutch elements 31 and 57 until the shafts 20 and 21 are synchronized.

In order to actuate the positive clutch by moving the sleeve 55 along the quill shaft 21 to the left as viewed in FIG. 2, there is provided a fluid operated clutch drive means indicated generally by the reference numeral 61. The clutch drive means 61 includes a plurality of spaced apart plungers or cylindrical pistons 62 mounted within suitable bores 63 in the head of the piston 34. Each of the plungers 62 includes a head portion 64 exposed to the fluid pressure in the chamber 40. A sealing ring 65 carried by each plunger 62 prevents escape of fluid from the chamber 40 along the periphery of the plunger. Each of the plungers 62 further includes an axially extending stem 66 passing through a suitable opening 67 defined in an actuator plate 68. The opening 67 is shaped to provide a non-rotatable but sliding connection with the stem 66. A plurality of coil springs 69 interposed between the synchronizer plate 60 and the actuator plate 68 function normally to seat the synchronizer plate against the free end of the annular flange 30 on the clutch plate support 26 and also function to urge the actuator plate 68 against a shoulder 70 formed on each plunger 62 between its stem 66 and its main body. The inner end of the actuator plate 68 is splined for rotation with the sleeve 55 as indicated by the reference numeral 71. Movement of the plate 68 to the right as viewed in FIG. 2 is prevented by means of a snap ring 72 seated within an annular grove 73 formed in the periphery of the sleeve 55 while movement of the plate 68 along the sleeve to the left is blocked by a shoulder 76 formed on the sleeve by the toothed portion 58. In this manner, the actuator plate is fixedly secured to the sleeve 55.

Figure 3:
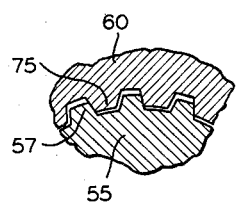
FIG. 3 is an enlarged, fragmentary, sectional view showing particularly the synchronizer mechanism referred to above and taken along a line substantially corresponding to the line 3—3 in FIG. 2.

Synchronizer plate 60 includes spaced openings 74 defined near its outer end for the purpose of receiving the axial stems 66 of the plungers when the latter are moved toward the left by the fluid pressure in the chamber 40. The inner end of the synchronizer plate 60 is provided with internal teeth 75 normally engaging the teeth on the sleeve 55. With the clutch 10 in its de-energized condition, that is, in the absence of fluid pressure in the chamber 40 of sufficient magnitude to move the piston 34, the teeth 75 loosely engage the toothed portion 57 on the sleeve 55 as is best shown in FIG. 3 of the drawing. Under these conditions the coil springs 35 are effective to force the clutch block 33 to the right as viewed in FIG. 2 and the coil springs 69 act through the actuator plate 68 to force the plungers 62 to the right. This may be referred to as the inoperative position of the piston 34 and the plungers 62. When it is desired to actuate the clutch 10, fluid is admitted through the passageways 45 and 46, through the annular groove 44 and through the passageways 41, 42 and 43 to the chamber 40. The fluid pressure in the chamber 40 forces the piston 34 to the left as viewed in FIG. 2 so that the annular extension 52 engages the movable clutch block 33 and pushes the latter to the left to compress the coil springs 35. Movement of the clutch block 33 to the left forces the clutch plates 24 and 25 into frictional engagement and provides a friction type drive between the quill shaft 21 and the inner shaft 20. The fluid pressure in the chamber 40 also moves the plungers 62 to the left as viewed in FIG. 2 in order to move both the actuator plate 68 and the sleeve 55 to the left. Leftward movement of the sleeve 55 seats the teeth 75 of the synchronizer plate against the shoulder 59. The synchronizer plate is, of course, rotated with the sleeve 55 due to the engagement of teeth 57 and 75. If the members 20 and 21 are rotating at different speeds, the frictional force acting between the synchronizer plate 60 and the annular flange 30 on the clutch plate support 26 forces the synchronizer plate to occupy a position wherein its teeth 75 are misaligned with respect to the toothed portion 58 of the sleeve 55 and, as a result, further movement of the sleeve 55 to the left is prevented. When the shafts 20 and 21 are synchronized, there is no longer a force component acting between the synchronizer plate 60 and the annular flange 30 to effect the described misalignment of the teeth 75 and 58 and, accordingly, as the shafts are brought into synchronism the teeth 58 and 75 are aligned and the sleeve 55 is then free to continue its leftward movement under the influence of the fluid pressure acting upon the plungers 62. As the sleeve 55 moves to the left the teeth 57 are confronted by the projections or teeth 31 and, if these two sets of teeth are in alignment, a complete engagement of the positive clutch is effected. If the teeth 31 and 57 are misaligned, the left hand side of the sleeve 55 is held against the right hand side of the teeth 31 by the fluid pressure on the plungers 62 and this position is maintained until the input torque exceeds the holding capacity of the clutch discs 24 and 25. When the input torque becomes excessive, the clutch discs 24 and 25 tend to slip slightly to permit full engagement of the teeth 31 and 57 whereupon both a friction type drive and a positive drive are provided between the shafts 20 and 21. The clutch discs 24 and 25 remain in operation simultaneously with the positive clutch so that any excess torque which would tend to produce slippage between the discs 24 and 25 is assumed by the positive clutch elements 31 and 57. As indicated above, during the releasing of the clutch 10 it is desirable to break the power train to the transmission 11 and this is accomplished by appropriate valving in the hydraulic control system 18 which valving functions to operate the master clutch 17 in sequence with the delivery of fluid under pressure to the chamber 40.

To disengage the clutch 10, the valving is rendered effective either automatically or manually to release or reduce the fluid pressure within the chamber 40 whereupon the coil springs 69 are effective to move the sleeve 55 and the actuator plate 68 to the right as viewed in FIG. 2 in order to disengage the positive clutch elements 31 and 57 and to move the synchronizer plate 60 out of engagement with the toothed portion 58. At the same time, the biasing springs 35 are effective to move the clutch block 33 to the right as viewed in FIG. 2 in order to return the piston 34 to its inoperative position at the right of the chamber 40 with the result that both the positive clutch and the friction clutch are released.

In view of the foregoing description it will be observed that the enumerated objects of the present invention have been accomplished by the provision of a positive type clutch which assumes all input torque exceeding that which is required to produce slippage between the clutch discs of the friction clutch. In this manner a large capacity clutch can be provided without increasing the number of clutch discs or their size with the attendant advantages described above in manufacture and servicing.

While an illustrative embodiment of the present invention has been shown and described, it will be recognized that various modifications will readily occur to those skilled in this art and it is therefore contemplated by the appended claims to cover any such modifications as fall within the true spirit and scope of the invention.

What is claimed as new and desired to be secured by Letters Patent of the United States is:

1. A clutch construction comprising a first shaft, a second shaft telescoping said first shaft, at least one of said shafts being driven, a clutch drum secured for rotation with said second shaft and including means defining a piston chamber, a clutch plate support secured for rotation with the first shaft and carrying a plurality of clutch plates interleaved with plates carried by the drum, a piston disposed within said chamber and movable between operative and inoperative positions, means selectively operable to supply fluid under pressure to said chamber to move said piston from its inoperative position to its operative position in order to force the interleaved clutch plates into frictional engagement and provide a drive between said shafts, and also operable to release the fluid pressure in said chamber, biasing means acting in opposition to the fluid pressure and functioning when the fluid pressure is released to return the piston to its inoperative position wherein the interleaved plates are disengaged, at least one plunger mounted in said piston and having a head portion exposed to the fluid pressure in said chamber, said plunger being movable from an inoperative position to an operative position in response to the fluid pressure in said chamber, a sleeve slidably mounted for axial movement on said second shaft, means operably connecting said sleeve and said plunger in order to slide said sleeve along said second shaft when said plunger is moved to its operative position, a synchronizer plate carried by said sleeve, biasing means effective upon said synchronizer plate and said plunger to seat the synchronizer plate against said support and to urge the plunger in a direction tending to return it to its inoperative position, said sleeve having a first externally toothed portion and a second externally toothed portion of larger size than the first portion, a shoulder on said sleeve connecting said first and second toothed portions, internal teeth on said synchronizer plate normally engaging the first toothed portion of the sleeve when the plunger is in its inoperative position, said synchronizer plate being seated against said shoulder as said plunger is moved from its inoperative position toward its operative position, thereby to block axial movement of the sleeve, said synchronizer plate also being effective when the rotations of said shafts are substantially synchronized to move its teeth into engagement with said second toothed portion in order to permit further axial movement of the sleeve by said plunger, and projections on said support for engaging said first toothed portion of said sleeve in order to provide a positive drive between said shafts even though the input torque to the driven shaft exceeds the holding capacity of the interleaved plates.

2. A clutch construction comprising first and second relatively rotatable shafts, a clutch drum secured for rotation with said second shaft and including means defining a piston chamber, a clutch plate support secured for rotation with the first shaft and carrying a plurality of clutch plates interleaved with plates carried by the drum, a piston disposed within said chamber and movable between operative and inoperative positions, means selectively operable to supply fluid under pressure to said chamber to move said piston from its inoperative position to its operative position in order to force the interleaved clutch plates into frictional engagement and provide a drive between said shafts, and also operable to release the fluid pressure in said chamber, biasing means acting in opposition to the fluid pressure and functioning when the fluid pressure is released to return the piston to its inoperative position wherein the interleaved plates are disengaged, at least one plunger mounted in said piston and having a head portion exposed to the fluid pressure in said chamber, said plunger being movable from an inoperative position to an operative position in response to the fluid pressure in said chamber, a sleeve slidably mounted for axial movement on said second shaft, means operably connecting said sleeve and said plunger in order to slide said sleeve along said second shaft when said plunger is moved to its operative position, a synchronizer plate carried by said sleeve, biasing means effective upon said synchronizer plate and said plunger to seat the synchronizer plate against said support and to urge the plunger in a direction tending to return it to its inoperative position, a first positive clutch element on said sleeve, a second positive clutch element on said support for engaging said first positive clutch element in order to provide a positive drive between said shafts irrespective of slippage between the interleaved clutch plates.

3. A clutch construction comprising first and second shafts at least one of which is driven, a clutch drum secured for rotation with said second shaft and including means defining a piston chamber, a clutch plate support secured for rotation with the first shaft and carrying a plurality of clutch plates interleaved with plates carried by the drum, a piston disposed within said chamber and movable between an operative position and an inoperative position wherein the interleaved clutch plates are forced into frictional engagement to provide a drive between said shafts wherein the interleaved plates are disengaged, a first fluid operated means controlling the movement of said piston, a sleeve slidably but non-rotatably mounted for axial movement on said second shaft, a second fluid operated means for controlling movement of said sleeve along said second shaft, a synchronizer plate carried by said sleeve, biasing means effective to seat the synchronizer plate against said support, said sleeve having a first externally toothed portion and a second externally toothed portion of larger size than the first portion, a shoulder on said sleeve connecting said first and second toothed portions, internal teeth on said synchronizer plate normally engaging the first toothed portion of the sleeve when the plunger is in its inoperative position, said synchronizer plate being seated against said shoulder as said plunger is moved from its inoperative position toward its operative position, thereby to block axial movement of the sleeve, and said synchronizer plate being effective when the rotations of said shafts are substantially synchronized to move its teeth into engagement with said second toothed portion in order to permit further axial movement of the sleeve by said plunger, and projections on said support for engaging said first toothed portion of said sleeve in order to provide a positive drive between said shafts even though the input torque to the driven shaft exceeds the holding capacity of the interleaved clutch plates.

4. A clutch construction comprising first and second shafts at least one of which is driven, a clutch drum secured for rotation with said second shaft and including means defining a piston chamber, a clutch plate support secured for rotation with the first shaft and carrying a plurality of clutch plates interleaved with plates carried by the drum, a piston disposed within said chamber and movable between an operative position wherein the interleaved clutch plates are forced into frictional engagement to provide a drive between said shafts and an inoperative position wherein the interleaved plates are disengaged, a first fluid operated means for controlling the movement of said piston, a sleeve slidably mounted for axial movement on said second shaft, a second fluid operated means for controlling the movement of said sleeve along said second shaft, a first positive clutch element on said sleeve, a second positive clutch element on said support engageable by said first positive clutch element to provide a positive drive between said shafts even though the input torque to the driven shaft exceeds the holding capacity of the interleaved clutch plates, and blocker means interposed between the said sleeve and the said support to prevent engagement of the positive clutch elements until the rotations of said shafts are synchronized.

5. A clutch construction comprising first and second shafts at least one of which is driven, a clutch drum secured for rotation with said second shaft and including means defining a piston chamber, a clutch plate support secured for rotation with the first shaft and carrying a plurality of clutch plates interleaved with plates carried by the drum, a piston disposed within said chamber and movable between an operative position wherein the interleaved clutch plates are forced into frictional engagement to provide a drive between said shafts and an inoperative position wherein the interleaved plates are disengaged, a first fluid operated means for controlling the movement of said piston, first and second positive clutch elements respectively secured for rotation with said clutch plate support and said second shaft, a second fluid operated means for effecting movement of one of said positive clutch elements so that said positive clutch elements and said interleaved clutch plates are both engaged in order to insure drive between said shafts even though the input torque to the driven shaft exceeds the holding capacity of the interleaved clutch plates, and synchronizer plate means interposed between said clutch plate support and said one positive clutch element to prevent engagement of the positive clutch elements until the rotations of said shafts are synchronized.

6. A clutch construction comprising first and second shafts at least one of which is driven, a clutch drum secured for rotation with said second shaft and including means defining a piston chamber, a clutch plate support secured for rotation with the first shaft and carrying a plurality of clutch plates interleaved with plates carried by the drum, a piston disposed within said chamber and movable between operative and inoperative positions, means selectively operable to supply fluid under pressure to said chamber to move said piston from its inoperative position to its operative position in order to force the interleaved clutch plates into frictional engagement and provide a drive between said shafts, and also operable to release the fluid pressure in said chamber biasing means acting in opposition to the fluid pressure and functioning when the pressure fluid is released to return the piston to its inoperative position wherein the interleaved plates are disengaged, at least one plunger mounted in said piston and having a head portion exposed to the fluid pressure in said chamber, said plunger being movable from an inoperative position to an operative position in response to the fluid pressure in said chamber, a sleeve slidably mounted for axial movement on said second shaft, means operably connecting said sleeve and said plunger in order to slide said sleeve along said second shaft when said plunger is moved to its operative position, biasing means urging the plunger in a direction tending to return it to its inoperative position, a first positive clutch element on said sleeve, and a second positive clutch element on said support for engaging said first positive clutch element in order to provide a drive between said shafts even though the input torque to the driven shaft exceeds the holding capacity of the interleaved plates.

7. A clutch construction comprising a pair of relatively rotatable members; a fluid operated friction clutch including first and second friction clutch elements respectively driven by said members and engageable to establish drive between said members, a fluid operated piston movable from an inoperative position wherein said elements are disengaged to an operative position wherein said elements are engaged, means for selectively supplying fluid pressure to said piston to move it to said operative position and for relieving said fluid pressure, and biasing means for returning said piston to said inoperative position when said fluid pressure is relieved; first and second positive type clutch elements respectively driven by said members and effective when engaged to provide a drive between said members irrespective of slippage between said friction clutch elements; the first positive type clutch element comprising a sleeve slidably mounted for axial movement on one of said members; means responsive to the fluid pressure for effecting sliding movement of said sleeve into engagement with said second positive type clutch element; means responsive to relative rotation between said members for preventing engagement of said positive clutch elements until said members are synchronized; and additional biasing means acting in opposition to the fluid pressure to disengage the positive type clutch elements when the fluid pressure is relieved.

8. A clutch construction comprising a pair of relatively rotatable members at least one of which is driven; a fluid operated friction clutch including first and second friction clutch elements respectively connected to said members and frictionally engageable to establish drive between said members, a fluid operated piston movable from an inoperative position wherein said elements are disengaged to an operative position wherein said elements are engaged, means for selectively supplying fluid pressure to said piston to move it to said operative position and for relieving said fluid pressure, and biasing means for returning said piston to said inoperative position when said fluid pressure is relieved; first and second positive type clutch elements respectively connected to said members and effective when engaged to provide a drive between said members even though the input torque to said one member exceeds the capacity of said friction clutch; the first positive type clutch element comprising a sleeve slidably mounted for axial movement on one of said members, means responsive to the fluid pressure for effecting sliding movement of said sleeve into engagement with said second positive type clutch element; synchronizer plate means interposed between said sleeve and said second positive type clutch element to prevent engagement of the positive clutch elements until said relatively rotatable members are synchronized, and biasing means acting in opposition to the fluid pressure to disengage the positive type clutch elements when said fluid pressure is relieved.

9. A clutch construction comprising a pair of relatively rotatable members; a fluid operated friction clutch including first and second friction clutch elements respectively driven by said members and engageable to establish drive between said members, a fluid operated piston movable from an inoperative position wherein said elements are disengaged to an operative position wherein said elements are engaged, a first fluid operated means for controlling the movement of said piston, and means for supplying fluid under pressure to the last named means; first and second positive type clutch elements respectively driven by said members and adapted to be in simultaneous engagement with said friction clutch, said positive clutch elements being effective when engaged to provide a drive between said members irrespective of slippage between said friction clutch element; the first positive type clutch element comprising a sleeve slidably mounted for axial movement on one of said members; a second fluid operated means responsive to said fluid and operable simultaneously with said piston for controlling movement of said sleeve into engagement with said second positive type clutch element; and means responsive to relative rotation between said members for preventing engagement of said positive clutch elements until said members are substantially synchronized.

10. A clutch construction comprising a pair of relatively rotatable members at least one of which is driven; a fluid operated friction clutch including first and second friction clutch elements respectively driven by said members and frictionally engageable to establish drive between said members, a fluid operated piston movable from an inoperative position wherein said elements are disengaged to an operative position wherein said elements are engaged, a first fluid operated means for controlling movement of said piston, and means for supplying pressure fluid to the last named means; first and second positive type clutch elements respectively driven by said members and adapted to be in simultaneous engagement with said friction clutch, said positive clutch elements being effective when engaged to provide a drive between said members even though the input torque to said one member exceeds the capacity of said friction clutch; the first positive type clutch element comprising a sleeve slidably mounted for axial movement on one of said members; a second fluid operated means operable simultaneously with said piston and responsive to the pressure fluid for effecting sliding movement of said sleeve into engagement with said second positive type clutch element, and means responsive to relative rotation between said members to prevent engagement of said positive type clutch elements until said members are substantially synchronized.

11. A clutch construction comprising a pair of relatively rotatable members at least one of which is driven; a fluid operated friction clutch including first and second friction clutch elements respectively driven by said members and frictionally engageable to establish drive between said members; a fluid operated piston movable from an inoperative position wherein said elements are disengaged to an operative position wherein said elements are engaged, a first fluid operated means for controlling movement of said piston, and means for supplying pressure fluid to the last named means; first and second positive type clutch elements respectively driven by said members and adapted to be in simultaneous engagement with said friction clutch, said positive clutch elements being effective when engaged to provide a drive between said members even though the input torque to said one member exceeds the capacity of said friction clutch; a second fluid operated means responsive to said pressure fluid and operable simultaneously with said piston for controlling engagement of said positive type clutch elements; and means responsive to relative rotation between said members for preventing engagement of said positive clutch elements until said members are synchronized.

12. A clutch construction comprising a pair of relatively rotatable members at least one of which is driven; a fluid operated friction clutch including first and second friction clutch elements respectively driven by said members and frictionally engageable to establish drive between said members, a fluid operated piston movable from an inoperative position wherein said elements are disengaged to an operative position wherein said elements are engaged, a first fluid operated means for controlling movement of said piston, and means for supplying pressure fluid to the last named means; first and second positive type clutch elements respectively driven by said members and adapted to be in simultaneous engagement with said friction clutch, said positive clutch elements being effective when engaged to provide a drive between said members even though the input torque to said one member exceeds the capacity of said friction clutch; a second fluid operated means responsive to the pressure fluid and operable simultaneously with said piston for moving the first positive type clutch element into engagement with said second positive type clutch element, and means responsive to relative rotation between said members for preventing engagement of said positive type clutch elements until said members are synchronized.

13. In combination, a pair of relatively rotatable members, a friction type clutch for connecting said members, a positive type clutch operative simultaneously with said friction type clutch for connecting said members in order to insure drive between the members irrespective of slippage of said friction type clutch, a first fluid pressure operated means for controlling the operation of said friction type clutch, means for supplying fluid under pressure to the last named means, a second fluid pressure operated means operable simultaneously with said first fluid pressure operated means and responsive to said fluid for controlling the operation of said positive type clutch, and means responsive to relative rotation between said members for preventing engagement of said positive type clutch until said members are substantially synchronized.

14. In combination, a pair of relatively rotatable members at least one of which is driven, a friction type clutch for connecting said members, a positive type clutch operative simultaneously with said friction type clutch for also connecting said members in order to insure drive between the members even though the input torque supplied to said one member exceeds the capacity of the friction type clutch, a first fluid pressure operated means for controlling the operation of said friction type clutch, means for supplying fluid under pressure to the last named means, a second fluid pressure operated means operable simultaneously with said first fluid pressure operated means and responsive to said fluid for controlling the operation of said positive type clutch, and means responsive to relative rotation between said members for preventing engagement of said positive type clutch until said members are substantially synchronized.

(References on following page)

References Cited in the file of this patent

UNITED STATES PATENTS

| | | |
|---|---|---|
| 2,375,790 | Iavelli et al. | May 15, 1945 |
| 2,470,208 | Avila | May 17, 1949 |
| 2,640,573 | Shenk | June 2, 1953 |
| 2,710,086 | Stahl | June 7, 1955 |
| 2,804,780 | Gerst | Sept. 3, 1957 |
| 2,807,343 | Ryder et al. | Sept. 24, 1957 |

FOREIGN PATENTS

| | | |
|---|---|---|
| 761,411 | Great Britain | Nov. 14, 1956 |